Nov. 24, 1925.

J. BOWEN

THREAD GUARD FOR CASTERS

Filed March 28, 1922

1,563,152

Inventor—
James Bowen.
by his Attorneys—
Howson & Howson

Patented Nov. 24, 1925.

1,563,152

UNITED STATES PATENT OFFICE.

JAMES BOWEN, OF MANHEIM, PENNSYLVANIA, ASSIGNOR TO BOND FOUNDRY AND MACHINE COMPANY, OF MANHEIM, PENNSYLVANIA, A CORPORATION OF PENNSYLVANIA.

THREAD GUARD FOR CASTERS.

Application filed March 28, 1922. Serial No. 547,490.

*To all whom it may concern:*

Be it known that I, JAMES BOWEN, a citizen of the United States, residing in Manheim, Lancaster County, Pennsylvania, have invented a Thread Guard for Casters, of which the following is a specification.

One object of this invention is to provide a truck caster or similar device with novel means for mounting and enclosing its rotatable element, with a view to preventing the accumulation thereon of threads, waste, lint or the like, and the invention also includes a novel device for removing from the tread and sides of said element any material sticking to or picked up thereby.

I further desire to provide a simple, compact and substantial construction for rotatably supporting a caster wheel in its frame or bearing so that its operation cannot be interfered with by threads, etc., and the invention further contemplates a novel form of scraper for keeping the tread surface and sides of the caster wheel free from any accumulation of foreign material which might be picked up by or adhere to the same.

These objects and other advantageous ends I attain as hereinafter set forth, reference being had to the accompanying drawings, in which, Figs. 1 and 2 are respectively an end elevation and a plan of a truck caster constructed in accordance with my invention;

Figure 2:
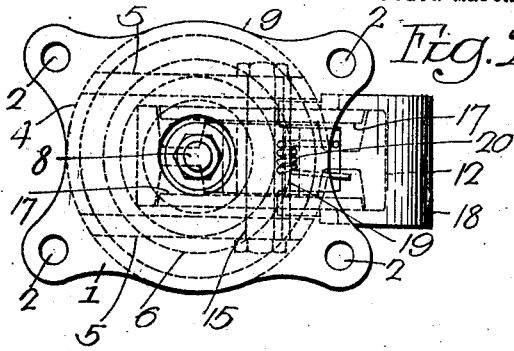
Figure 4:
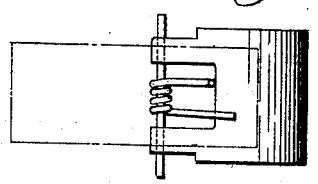
Fig. 4 is a plan of the scraper.
Figure 3:
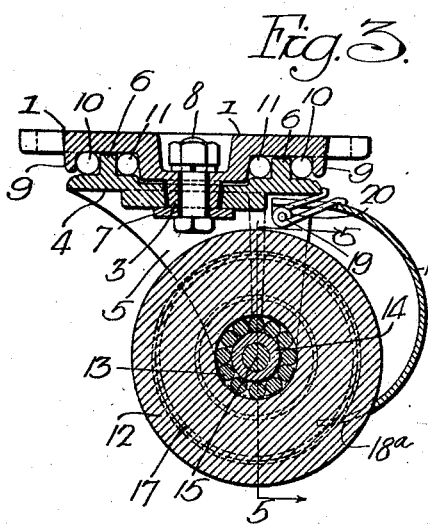
Fig. 3 is a vertical section on the line 3—3, Fig. 1.
Figure 1:
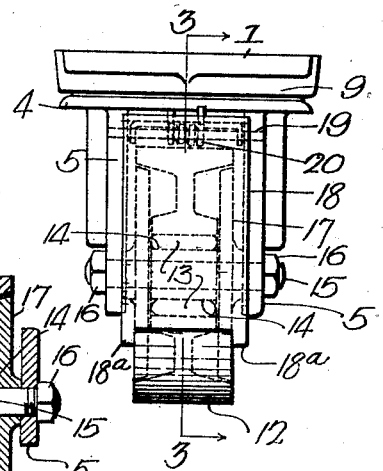
Figure 5:
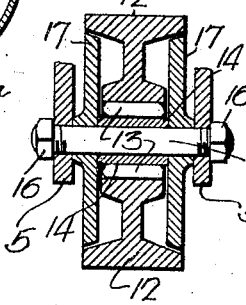
Fig. 5 is a vertical section on the line 5—5, Fig. 3.
Figure 6:
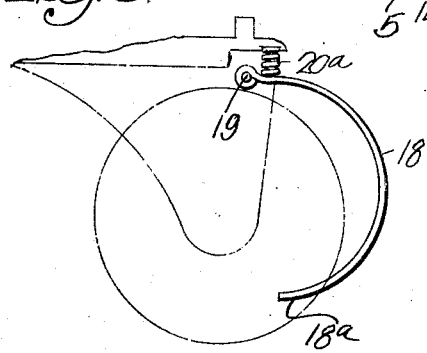
Figs. 6 and 7 are respectively a side elevation and a plan of a modified device for yieldingly holding the scraper in engagement with the caster wheel.

In the above drawings 1 represents a top or supporting plate having suitable openings 2 for the reception of screws or bolts whereby it may be attached to the bottom of a truck body, and including a downwardly projecting hub 3 for rotatably receiving a bearing plate 4 formed with two substantially parallel depending arms 5—5. The top face of this bearing plate is formed with an annular rib 6 substantially concentric with the hub 3 and the plate is held on the latter by a washer 7 clamped to the lower end of the hub by a bolt 8 whose upper end with the nut threaded thereon is countersunk in the base plate 1. The latter is formed with a peripheral circular rib or flange 9, between which and the hub 3 are mounted two sets of anti-friction bearings 10 and 11 separated from each other by the rib 6 of the bearing plate 4 with which they coact. The anti-friction bearing construction shown is not claimed as a part of my present invention, this being covered by my copending application for ball bearing casters, Ser. No. 621,760 filed February 28, 1923.

Mounted between the arms 5—5 is a caster wheel 12 rotatable on roller or other suitable anti-friction bearing elements 13 carried by a bushing 14 non-rotatably mounted on a fixed stud or spindle 15. The latter extends through the arms 5—5 and has nuts 16 mounted on its ends. Mounted between the ends of the bushing 14 and the adjacent arms 5 are two circular guard plates 17. The caster wheel 12 is provided with a flanged tread and said guard plates 17 fit into the opposite sides of the wheel so that their outer surfaces are substantially flush or coincident with the planes of said sides. The nuts 16 on the stud 15 are so set up that the bushing 14 and the two guard plates 17 are non-rotatably clamped to the arms 5, while the caster wheel 12 is free to rotate on its bearings between said guard plates. The hub of the wheel is located between the parallel inner faces of the guard plates and is thus retained against longitudinal movement.

Figure 7:
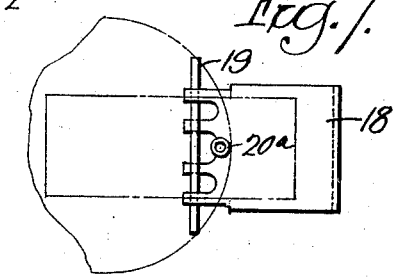

In order to prevent accumulation of threads or other material on the caster wheel, I provide a scraper in the form of a curved length of relatively stiff sheet metal 18 pivoted at one end on a pin or rod 19 extending between the arms 5 and having its opposite end bearing upon the tread surface of said wheel 12. This scraper is preferably though not necessarily, relatively sharp where it engages the caster wheel and it has lateral extensions 18ª at either side, bearing upon the sides of said wheel so that as the latter is turned, any material collecting either on its tread surface or on its sides is removed by the scraper. The latter is held in yielding contact with the wheel by a suitable spring, which, in that form of my invention shown in Figs. 1 to 4 inclusive, consists of a coil 20 of spring wire mounted on the pivot pin 19 and having its ends respectively in engagement with the scraper 18 and bearing plate 4. If desired however, other forms of spring may be used. For example, as shown in Fig. 7, I may provide a coil spring 20ª mounted between the bearing plate 4 and scraper 18 so that it is maintained under compression instead of being torsionally stressed as in the other form of the invention.

In any case however the scraper is yieldingly pressed toward the tread surface of the caster wheel so as to keep its tread and sides free from any accumulation of foreign material. The guard plates 17 effectually cover or enclose the sides of the caster wheel so that threads and dirt are kept away from the bearing elements 13 and from the stud or spindle 15 and bushing 14 with which they are associated.

I claim:

1. The combination in a caster, of a plate having spaced arms; a spindle; a wheel mounted on the spindle; a pin extending from one arm to the other arm above the wheel; a curved sheet metal scraper pivotally mounted on the pin and having its free end bearing against the periphery of the wheel; and a spring yieldingly holding the scraper in contact with the wheel.

2. The combination in a caster, of a plate having spaced arms; a spindle; a wheel mounted on the spindle; a pin extending from one arm to the other above the wheel; a curved metal scraper pivotally mounted on the pin and having lateral extensions at its free end to scrape the sides of the wheel; and a spring yieldingly holding the scraper in contact with the tread of the wheel.

JAMES BOWEN.